United States Patent Office 3,636,171
Patented Jan. 18, 1972

3,636,171
SELECTIVE CHLORINATION OF BENZENE AND CHLOROBENZENE USING A CATALYST OF ALUMINUM CHLORIDE AND STANNIC CHLORIDE OR TITANIUM TETRACHLORIDE
Karl L. Krumel, Midland, and James R. Dewald, Bay City, Mich., assignors to The Dow Chemical Company, Midland, Mich.
No Drawing. Filed Nov. 21, 1969, Ser. No. 878,900
Int. Cl. C07c 25/06, 25/08
U.S. Cl. 260—650 R
6 Claims

ABSTRACT OF THE DISCLOSURE

By conducting the reaction of chlorine with benzene or chlorobenzene in the presence of a small but effective amount of a catalyst containing 1 to 25% by weight of aluminum chloride and 75 to 99% by weight of stannic chloride, titanium tetrachloride or mixture thereof, high yields of the monochlorinated product are obtained, high para to ortho isomer ratios in the dichlorinated product are realized and chlorine is efficiently employed in the reaction.

BACKGROUND OF THE INVENTION

Chlorination of aromatic substrates in the presence of an aluminum chloride catalyst is well known. Chlorination of benzene and chlorobenzene with this catalyst, however, result in a high degree of polychlorination and a low para to ortho dichloro isomer ratio, even though the chlorine introduced into the reaction is used efficiently.

Mares in U.S. Pat. 2,111,866 teaches the chlorination of benzene in the presence of stannic chloride to give selective monochlorination. The advantage of this selective monochlorination, however, is offset by the low para to ortho isomer ratio in the dichlorinated product and by the inefficient utilization of the chlorine introduced into the reaction.

SUMMARY OF THE INVENTION

According to the present invention, selective monochlorination, high para to ortho dichloro isomer ratios and efficient use of chlorine are obtained in the reaction of benzene and chlorobenzene with chlorine in the presence of a small but effective amount of a catalyst containing 1 to 25% by weight of anhydrous aluminum chloride and 75 to 99% by weight of anhydrous stannic chloride, anhydrous titanium tetrachloride or mixture thereof.

The process of the present invention is conducted according to known techniques for catalytic chlorination. In such chlorinations, the chlorinatable substrate and a substitution chlorination catalyst are charged into a reactor, the substrate is maintained in the liquid phase, and chlorine is bubbled into the liquid until the desired amount of chlorine has been added. The products are then retrieved and separated by conventional means such as distillation.

The important and a critical aspect of the invention is the catalyst. The catalyst consists of anhydrous aluminum chloride in addition to either or both anhydrous stannic chloride and anhydrous titanium tetrachloride in the proportions specified. The preferred catalyst for the chlorination of benzene and/or chlorobenzene contains 0.01 to 0.15 gram of aluminum chloride per mole of aromatic and 0.5 to 5 or more grams of stannic chloride, titanium chloride or mixture thereof per mole of aromatic. Catalysts containing 0.05 to 0.12 gram of aluminum chloride and 0.07 to 2 grams of either stannic chloride or titanium chloride per mole of the aromatic substrate are especially preferred. If more aluminum chloride is employed in the reaction, the aluminum chloride tends to dominate the reaction giving polychlorination and low selectivity in the dichlorination which is typical of using aluminum chloride alone. On the other hand, if more stannic chloride or titanium tetrachloride is employed, a further increase in the selectivity is not sufficient to warrant the added amounts of catalyst required.

The reaction conditions under which the reaction of the present invention may be run are well known. The reaction is conducted in the same manner as ordinary chlorinations using more conventional chlorination catalysts such as aluminum chloride. The reaction is conducted at a temperature which maintains the liquid phase of the aromatic substrate and the pressure is maintained at a level which assures sufficient contact of the chlorine with the substrate, for example, a mixture of benzene and chlorobenzene is generally chlorinated at a temperature of 20° to 80° C. at atmospheric pressure.

SPECIFIC EMBODIMENTS

Example 1.—Chlorination with aluminum chloride-stannic chloride

A 500 ml. reactor consisting of a 3-necked flask equipped with a mechanical stirrer, condenser attached to a gas scrubber, thermometer and gas addition tube was prepared. Into this reactor was charged 350 ml. (3.549 moles) of a mixture containing 44.4% by weight benzene and 55.6% by weight of monochlorobenzene, 0.35 g. of anhydrous aluminum chloride and 3.15 g. of anhydrous stannic chloride. The stirred mixture was warmed to 50° C. and the chlorine was added at a rate of 600 to 800 ml./min. As the reaction proceeded, the reaction mixture was periodically sampled and analyzed by gas-liquid chromatography. The results of the analyses at various times are shown in Table I. Initially, 1.8% of the chlorine added to the reaction mixture did not react and passed through the solution. At the point when enough chlorine had been added for complete monochlorination assuming 100% efficiency, 10.1% of the chlorine introduced was passing through the reaction mixture without reacting. Over this period, 7.3% of the chlorine introduced did not react.

TABLE I.—CHLORINATION USING A CATALYST OF 0.1% ALUMINUM CHLORIDE AND 0.9% STANNIC CHLORIDE

| Moles of Cl$_2$ added/mole of Aromatic | Benzene | Monochlorobenzene | p-Dichlorobenzene | o-Dichlorobenzene | Highers | P/O dichloro isomer ratio |
|---|---|---|---|---|---|---|
| 0 | 44.4 | 55.6 | | | | |
| 0.139 | 33.5 | 65.4 | 0.9 | 0.3 | | 3.0 |
| 0.238 | 25.0 | 72.1 | 2.0 | 0.9 | | 2.22 |
| 0.357 | 15.4 | 78.6 | 4.3 | 1.7 | | 2.53 |
| 0.476 | 11.2 | 79.4 | 6.7 | 2.8 | | 2.39 |
| 0.675 | 3.2 | 76.5 | 13.9 | 6.4 | | 2.17 |
| 0.889 | 0.3 | 62.5 | 25.4 | 11.5 | 0.3 | 2.21 |

Example 2.—Chlorination with aluminum chloride-titanium tetrachloride

A parallel experiment to that described in Example 1 was conducted except for the substitution of 3.15 grams of titanium tetrachloride for the 3.15 grams of stannic chloride. The results of the analysis by gas-liquid chromatography at various times of addition are shown in Table II. During the addition of chlorine to the point where complete monochlorination would have occurred at 100% efficiency, 9.1 to 15.5% of the chlorine passed through the reaction mixture without reacting, with an average of 10.9% being unreacted.

TABLE II.—CHLORINATION USING A CATALYST OF 0.1% ALUMINUM CHLORIDE AND 0.9% TITANIUM TETRACHLORIDE

| Moles of Cl₂ added/mole of aromatic | Product analysis, wt. percent | | | | | P/O dichloro isomer ratio |
|---|---|---|---|---|---|---|
| | Benzene | Monochlorobenzene | p-Dichlorobenzene | o-Dichlorobenzene | Highers | |
| 0 | 44.4 | 55.6 | | | | |
| 0.119 | 34.7 | 64.6 | 0.6 | 0.2 | | 3.0 |
| 0.238 | 25.5 | 72.1 | 1.8 | 0.6 | | 3.0 |
| 0.357 | 17.0 | 77.9 | 3.9 | 1.2 | | 3.25 |
| 0.476 | 10.6 | 80.5 | 6.5 | 2.3 | | 2.82 |
| 0.675 | 2.6 | 77.7 | 14.1 | 5.7 | | 2.48 |
| 0.905 | 0.4 | 67.4 | 22.8 | 9.5 | | 2.40 |
| 1.115 | 0.1 | 59.0 | 28.9 | 12.0 | | 2.40 |
| 1.267 | | 52.8 | 32.6 | 14.5 | 0.1 | 2.25 |

Comparative Example A.—Chlorination with aluminum chloride

In a parallel experiment to that shown in Example 1, the reaction was conducted with 1.05 grams of aluminum chloride as the catalyst which is a catalyst concentration of .3 gram per mole of the hydrocarbon reactant. The results of this comparative experiment are shown in Table III. During the chlorine addition up to the point of theoretical monochlorination, 0 to 3.2% of the chlorine was unreacted, with an average of 0.9% being unreacted.

TABLE III.—CHLORINATION USING A CATALYST OF ALUMINUM CHLORIDE

| Moles of Cl₂ added/mole of aromatic | Product analysis, wt. percent | | | | | P/O dichloro isomer ratio |
|---|---|---|---|---|---|---|
| | Benzene | Monochlorobenzene | p-Dichlorobenzene | o-Dichlorobenzene | Highers | |
| 0 | 44.4 | 55.6 | | | | |
| 0.119 | 33.9 | 64.2 | 1.3 | 0.6 | | 2.2 |
| 0.238 | 19.7 | 74.4 | 3.6 | 2.3 | | 1.57 |
| 0.357 | 18.3 | 72.8 | 5.5 | 3.5 | | 1.57 |
| 0.476 | 12.4 | 73.5 | 8.8 | 5.3 | | 1.66 |
| 0.675 | 4.3 | 68.1 | 16.1 | 11.5 | | 1.40 |
| 0.873 | 1.2 | 57.5 | 24.2 | 17.0 | .2 | 1.42 |
| 1.123 | | 36.6 | 36.0 | 26.1 | 1.3 | 1.38 |
| 1.270 | | 23.6 | 43.0 | 30.8 | 2.6 | 1.40 |
| 1.333 | | 10.9 | 49.5 | 33.4 | 6.3 | 1.48 |

Comparative Example B.—Chlorination with stannic chloride

In a manner similar to that described in Example 1, 600 grams of pure benzene were chlorinated in the presence of 6 grams of stannic chloride at a temperature of 40° C. Chlorine was added to the reaction at a rate of 600 to 800 ml./min. The results of this comparative test are shown in Table IV. During the chlorine addition up to about theoretical monochlorination assuming 100% efficiency, 25 to 38% of the chlorine passed through the reaction without reacting, with an average of 33% of the chlorine being unreacted.

TABLE IV.—CHLORINATION USING A CATALYST OF 1% STANNIC CHLORIDE

| Moles of Cl₂ added/mole of aromatic | Product analysis, wt. percent | | | | | P/O dichloro isomer ratio |
|---|---|---|---|---|---|---|
| | Benzene | Monochlorobenzene | p-Dichlorobenzene | o-Dichlorobenzene | Highers | |
| 0 | 100 | | | | | |
| 0.28 | 77.8 | 22.2 | | | | |
| 0.69 | 55.1 | 44.9 | | | | |
| 1.00 | 33.9 | 64.2 | 1.3 | 0.6 | | 2.16 |
| 1.28 | 18.1 | 76.4 | 3.7 | 1.8 | | 2.06 |
| 1.57 | 7.1 | 81.6 | 7.3 | 4.0 | | 1.82 |
| 1.87 | 2.5 | 78.6 | 12.1 | 6.8 | | 1.78 |
| 2.18 | 0.4 | 70.1 | 18.9 | 10.7 | | 1.77 |
| 2.54 | | 50.9 | 31.5 | 17.6 | | 1.79 |
| 2.87 | | 40.8 | 37.7 | 21.5 | | 1.75 |

In the same manner as described in the examples above, a catalyst containing 0.01 gram of aluminum chloride and 5 grams of stannic chloride, titanium tetrachloride or mixture thereof or a catalyst containing 0.15 gram of aluminum chloride and 0.5 gram of stannic chloride, titanium tetrachloride or mixture thereof may be used as the catalyst in the chlorination of one mole of benzene or chlorobenzene to obtain similar results as shown in Examples 1 and 2, namely, selective monochlorination, high para to ortho ratios in the dichlorinated product and efficient use of the chlorine added to the reaction.

We claim:
1. In the process for chlorinating benzene, chlorobenzene or mixture thereof by contacting chlorine with the aromatic compound in the liquid phase in the presence of a substitution chlorination catalyst, the improvement comprising conducting the reaction in the presence of a catalytic amount of a catalyst comprising 1 to 25% by weight of aluminum chloride and 75 to 99% by weight of stannic chloride, titanium tetrachloride or mixtures thereof.

2. The process of claim 1 wherein the catalyst is 0.01–0.15 gram of anhydrous aluminum chloride per mole of the aromatic substrate and 0.5 to 5 grams of anhydrous stannic chloride, anhydrous titanium tetrachloride or mixture thereof per mole of the aromatic substrate.

3. The process of claim 2 wherein the catalyst is 0.05–0.12 gram of anhydrous aluminum chloride per mole of the aromatic and 0.7 to 2 grams of anhydrous stannic chloride, anhydrous titanium chloride or mixture thereof per mole of the aromatic.

4. The process of claim 1 wherein the catalyst contains anhydrous stannic chloride.

5. The process of claim 1 wherein the catalyst contains anhydrous titanium tetrachloride.

6. The process of claim 1 wherein the temperature is 20° to 80° C.

References Cited

UNITED STATES PATENTS 2,111,866   3/1938   Mares _____ 260—650 R
2,805,264   9/1957   Kissling _____ 260—650 R

OTHER REFERENCES

Ott et al., Z. Electrochem., 46, No. 3, 1940, pp. 105–106.

HOWARD T. MARS, Primary Examiner

U.S. Cl. X.R.

252—442